United States Patent [19]

Farmer

[11] Patent Number: 4,691,353
[45] Date of Patent: Sep. 1, 1987

[54] SCRAMBLING SYSTEMS FOR CATV

[75] Inventor: James O. Farmer, Doraville, Ga.

[73] Assignee: Scientific Atlanta, Inc., Atlanta, Ga.

[21] Appl. No.: 704,817

[22] Filed: Feb. 25, 1985

[51] Int. Cl.⁴ .......................................... H04N 7/167
[52] U.S. Cl. ........................................ 380/15; 380/10
[58] Field of Search ............... 358/120, 123, 114, 122, 358/118, 119

[56] References Cited

U.S. PATENT DOCUMENTS

| | | | |
|---|---|---|---|
| 2,857,455 | 10/1958 | Jolliffe | 358/123 |
| 3,081,376 | 3/1963 | Loughlin et al. | 358/120 |
| 3,103,550 | 9/1963 | Ellett | 358/120 |
| 3,333,052 | 10/1963 | Kahn | 358/120 |
| 4,338,628 | 7/1982 | Payne et al. | 358/120 |

Primary Examiner—Stephen C. Buczinski
Assistant Examiner—Melissa L. Koltak
Attorney, Agent, or Firm—Martin LuKacher

[57] ABSTRACT

In a TV signal scrambling system for use in a CATV network wherein premium programs are transmitted over cable, by broadcast transmission and the like with the sync pulses of the color TV signals suppressed, a processor is provided which processes the color components separately from the luminance and sync components so as to remove coherency (constant phase relationship) between the color subcarrier and the sync pulses. The separately processed components with the coherency removed are recombined to provide the composite TV signal which is scrambled and transmitted to the subscribers. Subscribers having television receivers of the type which recover sync signals by count down techniques from the color subcarrier, such as those using some integrated circuits (chip sets) are then made unable to recover the sync pulses unless equipped with an authorized descrambler. Unauthorized subscribers who are equipped with digital television receivers therefore obtain a scrambled TV picture which rolls horizontally across the screen.

13 Claims, 5 Drawing Figures

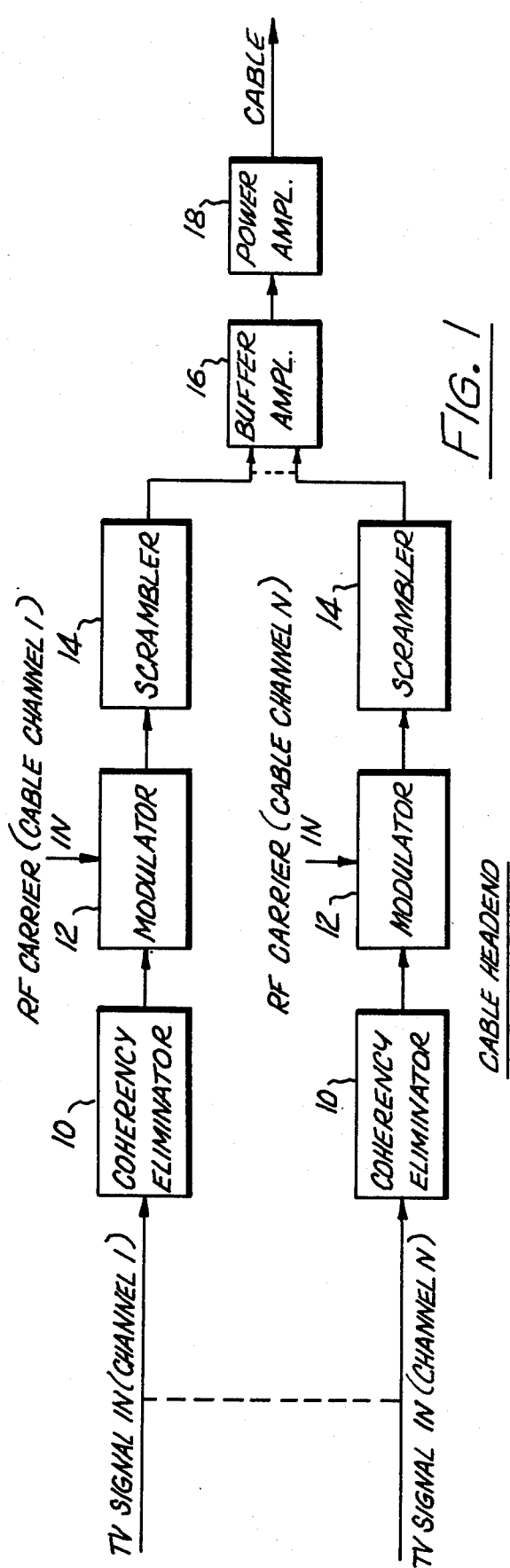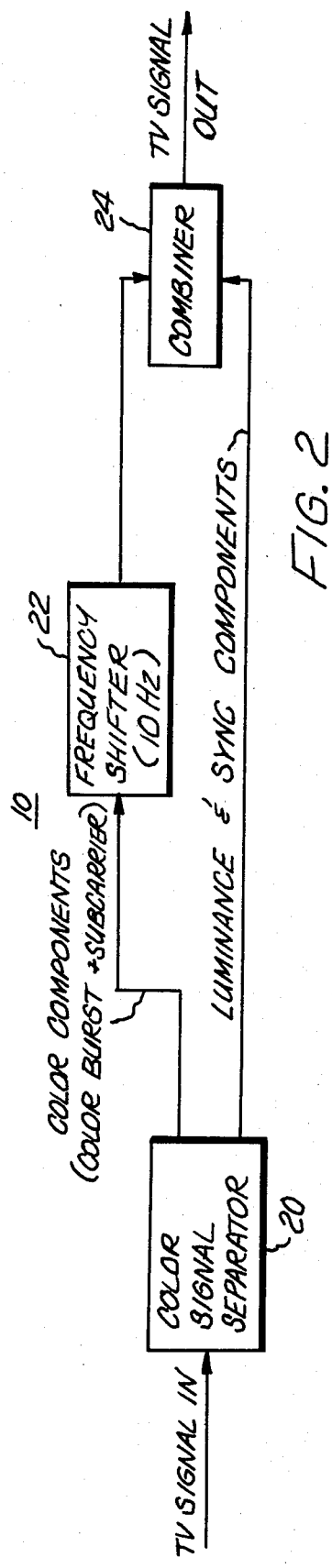

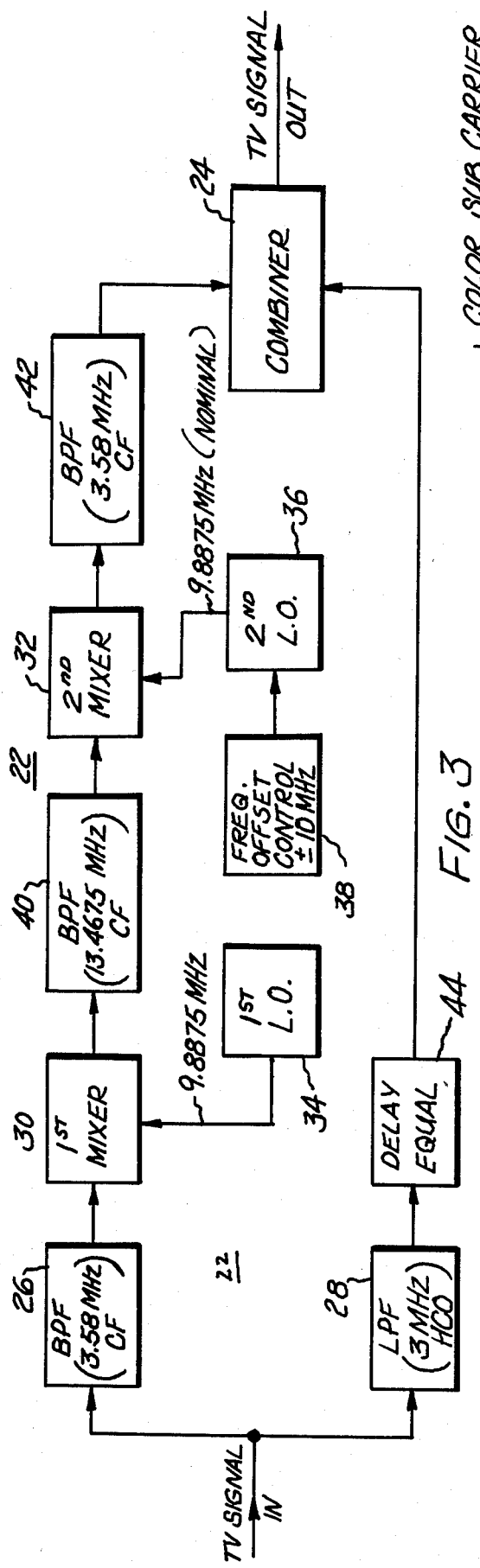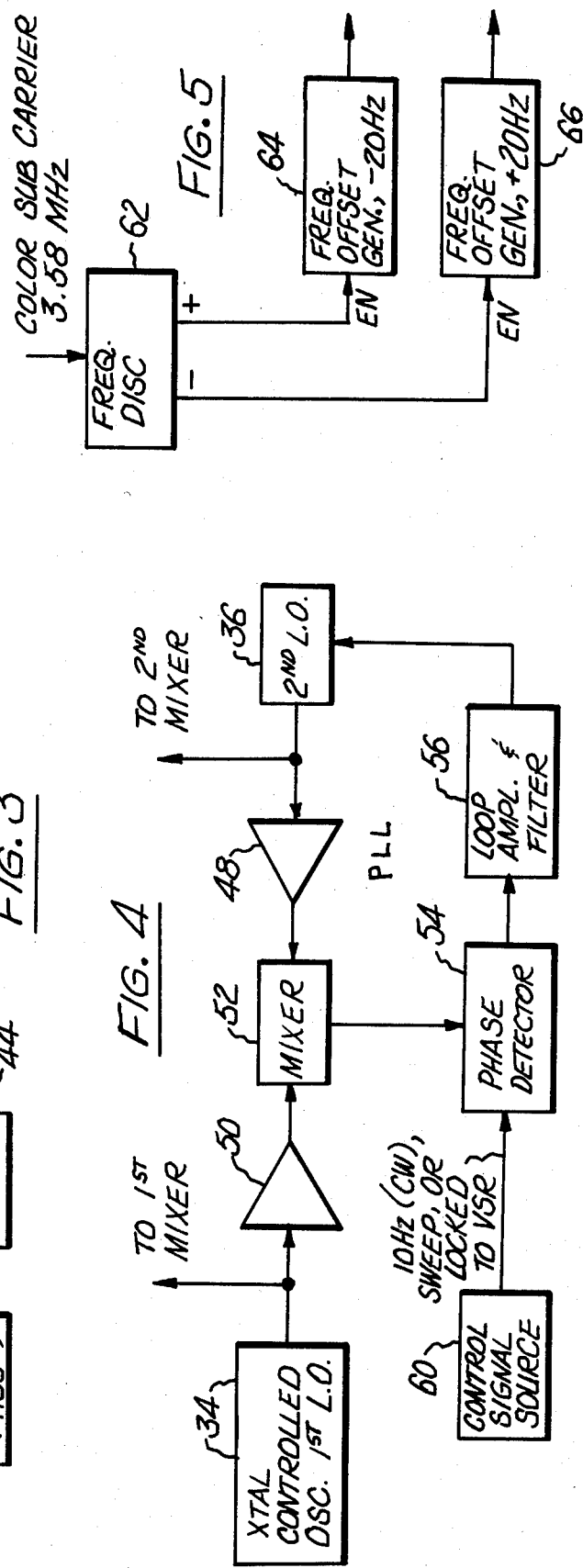

SCRAMBLING SYSTEMS FOR CATV

DESCRIPTION

The present invention relates to systems for scrambling premium color TV programs and particularly to a system for preventing the defeating the CATV scrambling systems which are sync based.

The invention is especially suitable for use in CATV scrambling systems wherein premium programming is transmitted over a cable or is broadcast to subscribers from antennas on land or in space, as on satellites. The term "CATV" is intended to comprehend all such systems.

The scrambling of premium color TV signals is carried out, at the present time, by the sync suppression technique wherein the level of the sync pulses are changed so that they are buried in voltage levels normally reserved for picture information in the TV signal. Reference may be had to Banker, U.S. Pat. No. 4,466,017, issued Aug. 14, 1984 for further information respecting sync suppression scrambling and descrambling systems. Descrambling is effected by transmitting timing information with the TV signal and frequently as timing pulses on the sound carrier. Authorized subscribers are supplied with descramblers which recognize this timing information and use it to restore the sync pulses to proper level. The scrambling systems may operate either at RF, as is the case with the illustrative system described hereinafter, or at baseband.

Governmental regulations require coherency (constant phase relationship) between the color subcarrier of the color TV signal and the sync pulses. When subscribers use television receivers which derive synchronizing pulses from the color subcarrier, as by a count down of the color subcarrier frequency, the timing information ordinarily required by authorized subscribers, is not needed. Then an unauthorized subscriber will be capable of obtaining a stable, intelligible picture from a scrambled color TV transmission without payment. The problem is becoming aggravated in that digital television systems which utilize integrated circuits (chip sets) operate to recover sync by counting down the color subcarrier frequency (see an article entitled "Digital TV: Makers Bet On VLSI" which appeared in *IEEE Spectrum Magazine*, February 1983, page 39).

The reception of color television signals does not require coherency between the synchronizing the color subcarrier signals (such coherency does not exist in signals from a VCR). Accordingly it has been discovered, in accordance with the invention, that by removing the sync to color subcarrier coherency, the defeating of CATV scrambling systems, which are sync based, through the use of a television receiver which operates in the count down mode, can be prevented. In such a receiver, the sync pulses contained in the television signal are still monitored, and if a difference is detected in the counted down sync time and the time of the detected sync pulses, the deflection circuits revert to conventional operation. Therefore, even the digital television sets will react to scrambled signals in a manner similar to conventional television sets and a distorted scrambled picture will appear on the screen in response to sync suppressed scrambled premium transmissions.

Accordingly, it is the principal object of the present invention to provide an improved scrambling system in which coherency between the synchronizing and color subcarrier signals is removed to prevent defeating of CATV scrambling systems which are sync based.

It is a further object of the present invention to provide an improved scrambling system which obviates the possibility of unauthorized reception of sync scrambled color TV signals by receivers, such as digital television receivers, which operate in the count down mode by counting down the frequency of the color subcarrier of the received TV signal.

It is a still further object of the present invention to provide an improved scrambling system wherein in the color subcarrier and the sync signals are processed to provide sufficient frequency difference therebetween whereby coherency of the sync and color subcarrier is removed, but without making the frequency difference large enough to cause loss of color lock.

Briefly described, the present invention is utilized in a system in which sync pulses of a color TV signal are changed in level (e.g., suppressed into picture levels) for the purpose of scrambling the color TV signal. The invention improves such scrambling systems through the use of means for separating the components of the TV signal which contain color information from the components of the TV signal which contain the sync information. Means are used for processing at least one of these components to remove coherence between the sync components and the color components. Means are used for recombining the separated components, after processing in the processing means, to provide a composite signal to which the sync pulses cannot be restored using the color components of the TV signal alone, but requiring a descrambler to restore and reinsert the sync pulses.

The foregoing and other objects, features and advantages of the ivnention, as well as a presently preferred embodiment thereof, will become more apparent from a reading of the following description in connection with the accompanying drawings in which:

FIG. 1 is a simplified block diagram of the head end of a CATV system which incorporates the present invention;

FIG. 2 is a simplified block diagram of the coherency eliminator circuits used in the system shown in FIG. 1;

FIG. 3 is a more detailed block diagram showing a choherency eliminator illustrated in FIG. 2 in accordance with an embodiment of the invention;

FIG. 4 is a block diagram of apparatus, in accordance with another embodiment of the invention, for controlling the frequency of the local oscillators in the coherency eliminator shown in FIG. 3; and FIG. 5 is a block diagram of another system for controlling the frequency of the local oscillators.

Referring first to FIG. 1 there is shown a portion of the cable head end equipment wherein each TV signal channel is processed, combined and transmitted over the cable or other transmission medium. The color TV signals of each channel are processed in coherency eliminators 10 and then modulated to RF and placed (multiplexed) into their assigned cable channel by modulators 12. Scramblers 14 suppress the sync pulses by attenuating the RF signals from the modulators at the times of occurrence of the sync pulses. Suitably, both the horizontal and vertical sync pulses are suppressed as described in the above reference Banker Patent. The signals are additively combined in a buffer amplifier 16 to the cable, for driving the cable.

The coherency eliminator is operative to eliminate the coherency between the color subcarrier and sync components of the signal. As shown in general form in FIG. 2, the coherency eliminator uses a color signal separator 20 which separates the color components, namely the color burst and subcarrier, from the luminance and sync components and applies them to separate channels.

One of these channels has a frequency shifter 22 which shifts the frequency of the color components enough so that the coherency between the color and sync components is removed. The frequency shift should not be so large as to prevnt color lock in the receiver. A frequency shift of approximately 10 Hz has been found suitable. A combiner 24 recombines the color and luminance and sync components from the two channels to provide the composite TV signal which then goes to the scrambler 14, as shown in FIG. 1.

Since the color burst in shifted in frequency with respect to the sync pulses, receivers which operate in the count down mode cannot consistently find the sync pulses. The effect of the removal of coherency by shifting the frequency of the color subcarrier, which is derived from the color burst, is to cause the picture to roll horizontally across the TV receiver screen. The vertical sync bar will slowly roll up or down the screen as well. The speed at which the folling occurs is proportional to the amount of frequency shift introduced. For a 10 Hz shift; the picture will roll horizontally in 22.8 seconds. The roll is generally not smooth, but rather is jerky due to the color oscillator attempting to lock to an assumed color burst which is really active color subcarrier. it is desirable to make the shift about 10 Hz so as to avoid loss of color lock in authorized television sets, and also to prevent loss of the effectiveness of comb filters employed in some television sets.

Referring to FIG. 3, a presently preferred implementation of the coherency eliminator is illustrated. The TV signal is separated into its color components and luminance and sync components by a band pass filter 26 and a low pass filter 28. The band pass filter has a center frequency of 3.58 MHz and is of sufficient width to pass the color burst and color subcarrier. The width of this filter may be approximately 600 KHz. The low pass filter 28 has a high end cutoff (HCO) of approximately 3 MHz. The frequency shifter 22 is an up-down converter having first and second mixers 30 and 32. These mixers receive injection signals from first and second local oscillators (LO's) 34 and 36. The frequencies of these oscillators is controlled by a frequency offset control circuit 38 so that they are 10 Hz apart. The up converted or sum frequencies are selected by a band pass filter 40 connected between the first and second mixers 30 and 32. The down converted output is extracted by another band pass filter 42 which is connected between the output of the second mixer and the combiner 24. The frequencies which are used are selected to be convenient frequencies above the color subcarrier frequency. In this preferred embodiment the local oscillator frequencies used are 9.8875 MHz which result in an up converted frequency of 13.4675 MHz. The second LO 36 has the same nominal frequency as the first LO 34. However, the frequency offset control adjusts the 2d LO, as by applying a control voltage to a varactor in its frequency determining circuits, so as to offset the two LO frequencies by a small amount, suitably 10 Hz.

The down converted color signal then has the same frequency as the input color signal except for a small difference caused by the difference in frequency of the two local oscillators 34 and 36. The modified color signal is then combined wth the luminance and sync components in the combiner 24 to provide the composite color TV output signal. The color information is carried in the amplitude and phase of the color subcarrier with respect to the color burst. Their relationship has not been changed by processing the separated color components. However, the coherency between the color burst and color subcarrier and the sync pulses has been eliminated. Accordingly, operation of television sets in the count down mode (the normal operation of many digital television sets) cannot be used to recover and defeat the scrambling of sync suppressed premium TV signals.

The separation filters 26 and 28 and the filters 40 and 42 in the frequency shifter 22 should be phase matched to avoid chrominance to luminance delay. If necessary, a delay equalizer 44 may be inserted in the luminance and sync component channel so that the sum of the delays in the filter 28 and in the delay in the equalizer 44 is equal to the sum of the delays in the filters 26, 40 and 42.

Referring to FIG. 4, there is shown a control circuit arrangement for providing the frequency offset. The first local oscillator 34 is desirably a crystal controlled oscillator. Its output frequency and the output frequency from the second local oscillator 36 are applied, through buffer amplifiers 48 and 50, to a mixer 52. The frequency difference between the local oscillator output frequencies, for example 10 Hz, is applied to a phase detector 54. The phase detector is connected to a loop amplifier and filter 56 to complete a phase locked loop including the detector 54, the loop amplifier and filter 56, the second local oscillator 36, the buffer amplifier 48 and the mixer 52. A control signal source 60 applies the control signal to the phase detector 54. This control signal may be a 10 Hz, continuous wave (cw) signal. Then, the second LO will be 10 Hz different in frequency than the first LO. The control signal source may provide a sweep frequency, for example from DC to 100 Hz, or it may be locked to the vertical sync pulse rate (VSR), as by a suitable count down circuit contained in the control signal source. If the sweep is slowly changing, for example in a random or quasi-random manner, the picture displayed on an unauthorized TV receiver screen would be even more distored than with a constant frequency offset.

It may be desirable that the frequency of the color subcarrier be increased or decreased to maintain the color subcarrier wthin 10 Hz of its nominal frequency (3.57954545 . . . MHz) in order to comply with governmental regulations applicable to cable operators. Accordingly, if the incoming subcarrier frequency is 10 Hz high the frequency should not be raised, since it then will be out of the specified tolerance. However the frequency could be lowered by 20 Hz and still be within tolerance. FIG. 5 illustrates an implementation whereby the specified color subcarrier tolerances may be maintained. The color subcarrier frequency is measured in a frequency discriminator 62 which provides bipolar outputs depending upon whether the incoming color subcarrier is on the high or low side of nominal frequency. Then frequency offset generators 64 and 66 are selectively enabled. These frequency offset generators may be voltage sources which apply control voltages to the varactor in the second local oscillators 36 (FIG. 3) to establish the 20 Hz (maximum) offset. The voltage is sufficient to produce a 20 Hz maximum offset in either the positive or negative direction, such that the color subcarrier frequency is maximally shifted without exceeding the limit specified by FCC regulation.

From the foregoing description, it will be apparent that there has been provided improvements for scrambling and descrambling systems which afford a countermeasure against defeating of such systems, as with digital television receivers. Variations and modifications in the herein described systems, within the scope of the invention, will undoubtedly suggest themselves to those skilled in the art. Accordingly, the foregoing description should be taken as illustrative and not in a limiting sense.

I claim:

1. In a system in which the sync pulses of a color TV signal are changed in level for the purpose of scrambling the color TV signal, the improvement which comprises means for separating the components of the TV signal which contain color information from the components of the TV signal which contain the sync information, means for processing at least one of said components to remove coherence between the sync components and the color components, and means for recombining said separated components after processing in said processing means to provide a composite signal to which the sync pulses cannot be restored using the color components of said TV signal alone.

2. In the system according to claim 1, wherein said sync pulses are suppressed to levels of picture information, and wherein said color components include a color subcarrier, said processing means comprising means for removing coherence between said sync pulses and said color subcarrier.

3. In the system according to claim 2, said processing means comprising means for shifting the frequency of said color subcarrier such that it is not coherent with said sync pulses.

4. In the system according to claim 3, said separating means including filter means for separating the luminance and sync components of said TV signal into a first channel and said color components including said color subcarrier and color burst into a second channel.

5. In the system according to claim 4, wherein said frequency shifting means is connected in said second channel, said recombining means being responsive to the signals from said first channel and from said frequency shifting means in said second channel.

6. In the system according to claim 5, wherein said frequency shifting means comprises up-down conversion means wherein the frequency to which said color subcarrier frequency is up converted and then down converted differs by a certain frequency offset within the color locking range of the TV receivers responsive to said color TV signals.

7. In the system according to claim 5, wherein said frequency shifting means shifts said color subcarrier frequency by an amount sufficient to defeat coherency and within the color locking range of the TV receivers responsive to said color TV signals.

8. In the system according to claim 7, wherein said frequency shift of said color subcarrier is less than about 100 Hz.

9. In the system according to claim 8, wherein said frequency shift is from about 10 to about 100 Hz.

10. In the system according to claim 6, wherein said up-down converter means comprises first and second mixers connected in series in said second channel, first and second local oscillators having first and second frequency outputs which are about equal to each other but differ from each other in frequency by said frequency offset, said first and second outputs being connected as injection frequency inputs to said first and second mixers, respectively, and filter means connected between said first and second mixers for selecting the sum mixer products and applying said sum mixer products to said second mixer.

11. In the system according to claim 10, wherein phase lock loop means are provided for locking said second and first local oscillator output frequencies to each other and inserting said frequency offset.

12. In the system according to claim 11, wherein said phase lock loop means includes a phase detector responsive to the frequency offset between said first and second local oscillator output frequencies, and means for applying a control signal to said phase detector means for controlling said offset.

13. In the system according to claim 10, means connected to said first and second local oscillators for controlling the frequency offset between said first and second local oscillator output frequencies, and means responsive to said color subcarrier frequency for operating said offset controlling means to provide an offset of about ±10 Hz.

* * * * *